United States Patent [19]

Bharucha et al.

[11] 4,076,849

[45] Feb. 28, 1978

[54] CONTROL OF NITROSAMINE FORMATION IN NITRITE CURED MEAT

[75] Inventors: Kekhusroo R. Bharucha; Leon J. Rubin, both of Toronto; Charles K. Cross, Rexdale, all of Canada

[73] Assignee: Canada Packers Limited, Toronto, Canada

[21] Appl. No.: 619,068

[22] Filed: Oct. 2, 1975

[51] Int. Cl.² .............................................. A23B 4/02
[52] U.S. Cl. .................................... 426/266; 426/281; 426/332; 426/641; 426/652
[58] Field of Search ............... 426/331, 601, 641, 645, 426/652, 654, 281, 265, 266, 332; 260/571, 574, 576, 577

[56] References Cited

U.S. PATENT DOCUMENTS

| | | | |
|---|---|---|---|
| 2,553,533 | 5/1951 | Komarik et al. | 426/265 |
| 2,828,212 | 3/1958 | Sair | 426/266 X |
| 3,052,560 | 9/1962 | Delaney | 426/652 X |
| 3,154,421 | 10/1964 | Vaegeli et al. | 426/652 X |
| 3,402,201 | 9/1968 | Schmerling | 260/576 |
| 3,901,981 | 8/1975 | Draudt | 426/645 X |

Primary Examiner—Raymond N. Jones
Assistant Examiner—Esther M. Kepplinger
Attorney, Agent, or Firm—Bacon & Thomas

[57] ABSTRACT

The formation of nitrosamines in cooked, cured meat products is reduced or eliminated by using certain aromatic secondary amines, such as p-alkoxy-N-alkylaminobenzenes, in the curing mixtures or to treat the cured meat.

20 Claims, 1 Drawing Figure

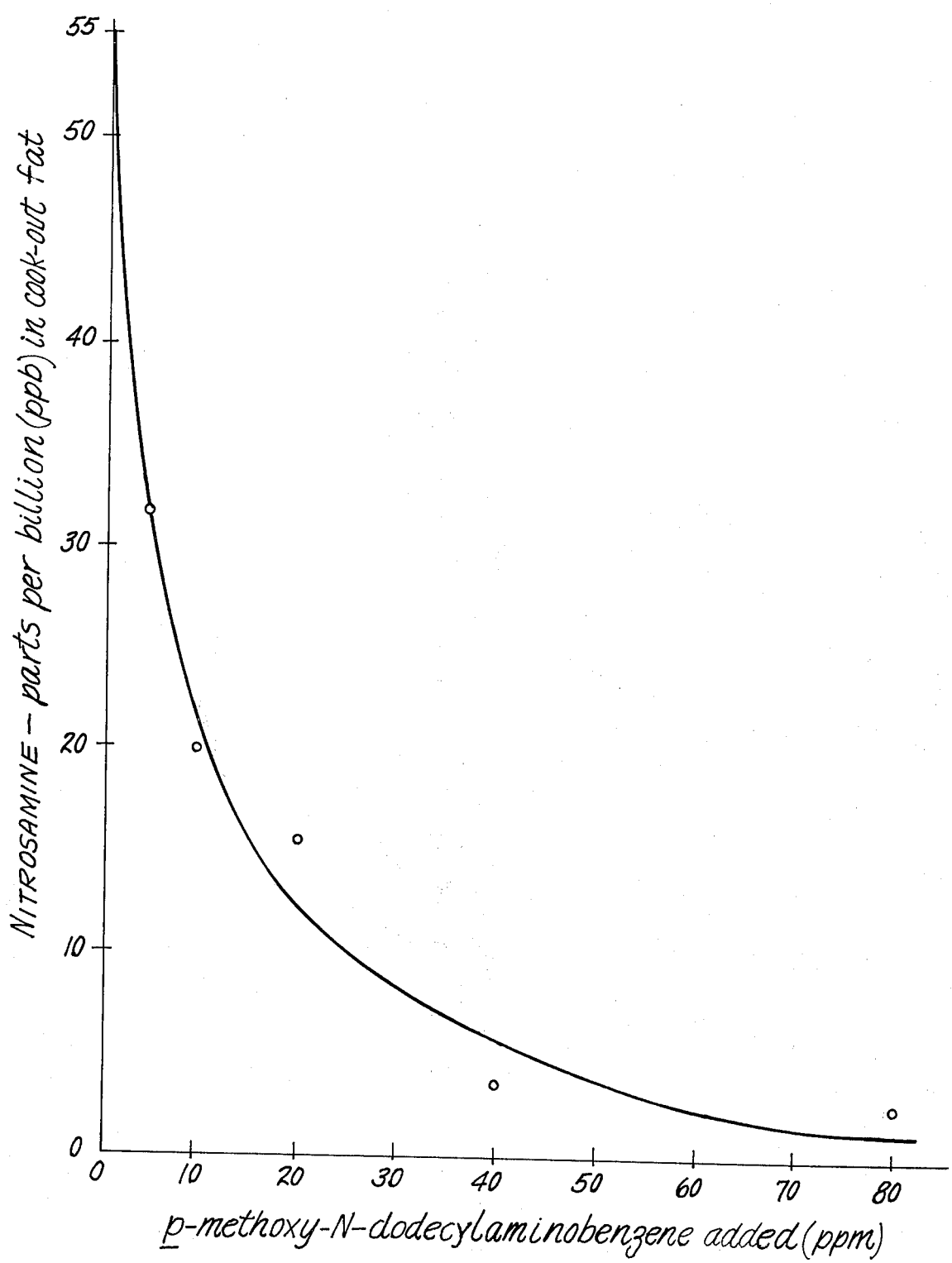

CONTROL OF NITROSAMINE FORMATION IN NITRITE CURED MEAT

CO-PENDING APPLICATIONS

This application is related to co-pending application Ser. No. 619,067 filed on even date by Kekhusroo R. Bharucha, Leon J. Rubin and Charles K. Cross now U.S. Pat. No. 4,039,690.

BACKGROUND OF THE INVENTION

This invention relates to control of nitrosamine formation in nitrite cured meat.

Cured meat products have been prepared for many years by treatment of fresh meat with an alkali metal nitrite-containing composition or with a composition containing a mixture of alkali metal nitrite and an alkali metal nitrate. Sodium chloride is generally present in the curing mixture and other materials such as sugar may also be present. Spices may be added. Ascorbic acid, isoascorbic acid (sometimes called erythorbic acid) or salts of ascorbic acid or isoascorbic acid are sometimes used to accelerate the formation of cured meat pigments.

The conventional alkali metal nitrite or nitrate-nitrite containing curing mixtures provide quite satisfactory cures insofar as cured-meat preservation, flavor, and development of the pink to red color characteristic of cured meats are concerned. Organic nitrites may be substituted for part or all of the alkali metal nitrite in these mixtures. Nitrates were at one time used alone and then one had to depend on bacterial action for their conversion to nitrites during the curing process. No practical substitute for the nitrite ion in the curing process has yet been discovered.

Unfortunately, minute amounts of undesirable nitrosamines may occur in meats, particularly bacon, which have been cured with the conventional curing mixtures, and which have been cooked by methods in which the fats reach relatively high temperatures. For example, N-nitrosopyrrolidine and dimethylnitrosamine are found on frying bacon, the cook-out fat containing the largest proportion of these nitrosamines with N-nitrosopyrrolidine being present in the greater amount. These nitrosamines are not found in the cured raw meats. Apparently, the temperature attained by the fats in frying or equivalent cooking processes, such as broiling, grilling, mirowave heating, etc., facilitates the reaction of alkali metal nitrites and amines of the meat to form nitrosamines. Since N-nitrosopyrrolidine and dimethylnitrosamine have been found to be carcinogenic in tests on experimental animals, they are regarded as a potential hazard in human food products. It is desirable, therefore, to reduce, eliminate or prevent the formation of these substances in cooked meat products. It was known to use that ethoxyquin had been found useful for this purpose. We have now discovered that a certain class of aromatic secondary amines, in which the nitrogen atom is not part of a heterocyclic ring structure, perform this function.

SUMMARY OF THE INVENTION

The present invention provides meat treating compositions and methods of treating nitrite cured meat which make use of a small quantity of an aromatic secondary amine, in which the nitrogen atom forms part of an open chain structure, to reduce or eliminate the nitrosamines which are generated when nitrite cured meat is cooked at the usual high temperatures attained during frying, grilling or broiling. We have discovered that, when a small amount of certain aromatic secondary amines, of the class described, are included in the curing mixtures or are otherwise applied to the meat before cooking, the proportion of undesirable nitrosamines contained in the meat after cooking is drastically reduced and in some instances virtually eliminated.

It is therefore an object of the invention to provide meat-curing compositions and methods which reduce or eliminate the formation of undesirable nitrosamines during subsequent cooking of the cured meat.

It is another object of the invention to provide a composition and method for curing bacon which reduces or eliminates the formation of undesirable nitrosamines in the bacon during the subsequent frying or equivalent cooking process.

A further object of the invention is to provide a nitrite cured meat product in which formation of undesirable nitrosamines during cooking is minimized.

DETAILED DESCRIPTION

The aromatic secondary amines which are suitable for practice of the invention include but are not necessarily limited to those defined by the following formula:

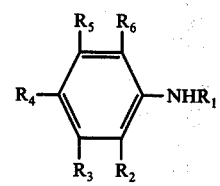

wherein:

$R_1$ is a hydrocarbon radical of one to eighteen carbon atoms, such as alkyl, of either straight or branched chain e.g. methyl, ethyl, propyl, butyl, 2,2-dimethylpropyl, hexyl, octyl, dodecyl, octadecyl, and the like; cycloalkyl, such as cyclohexyl; aryl, e.g. phenyl and naphthyl; alkaryl, e.g. tolyl and p-tert-butyl phenyl; or aralkyl, e.g. benzyl and phenethyl. The hydrocarbon radical may also be substituted with inert groups, such as alkoxy of 1 to 6 carbon atoms.

$R_2$, $R_3$, $R_4$, $R_5$ and $R_6$ are each selected from:
(a) Hydrogen
(b) A hydrocarbon radical as defined for $R_1$ above
(c) $-OR_7$ where $R_7$ is hydrogen or a hydrocarbon radical as defined for $R_1$ above, or two adjacent members $R_2$, $R_3$, $R_4$, $R_5$ and $R_6$ are cyclized to form the group $+CH_2+_n$ where $n$ is 3 to 5.

Preferably, at least one of $R_2$, $R_3$, $R_4$, $R_5$ and $R_6$ is $-OR_7$, as defined above, and the remainder are hydrogen or substituents as defined above.

In the most preferred group of compounds $R_4$, i.e. the position para to the secondary amine group ($-NHR_1$), is alkoxy and $R_1$ is alkyl. Preferably, also at least one of the ortho positions on the aromatic ring, e.g. $R_2$ or $R_6$, is left unsubstituted. With this preferred combination of substituents, the remainder of the aromatic nucleus may be substituted in almost any manner without destroying the activity of the compound for its intended purpose. Inert substituents, of course, increase the molecular weight and hence the activity of the compound on a weight basis may be correspondingly reduced.

The aromatic secondary amines of the invention do not significantly affect the nitrosyl pigments of the cured meat, and so do not appreciably affect its color. Additionally, the aromatic secondary amines do not materially change the nitrite content of the raw cured meat products, and thus do not impair its bacterial action. The mechanism by which the aromatic secondary amines interfere with the formation of carcinogenic nitrosamines at high temperature is not completely understood. However, the invention is not limited by any particular theory of operation. It has been shown by a series of tests and analysis that up to 100% of the nitrosamines which normally appear in fried bacon have been eliminated.

PREPARATION OF COMPOUNDS

The compounds utilized by the invention as defined by the structural formula above are either commercially available or are readily obtainable by any of a number of known chemical procedures. For example, the compounds may be prepared by starting with primary aminobenzenes, ortho-, meta- and para-aminophenols or with appropriate ortho-, meta- or para-nitrophenols, or with appropriately substituted derivatives thereof. The nitrophenols may be converted to the corresponding alkoxy nitro compounds, for example, by alkylation of the —OH group with alkyl iodide or bromide in the presence of anhydrous potassium carbonate in refluxing acetone. Primary amines may then be prepared by catalytic (palladium) reduction of the nitro group of the alkoxy nitro compound with hydrogen. The secondary amines are then prepared from the primary amines by acylation with acyl chlorides followed by reduction of the amide with diborane in tetrahydrofuran (THF). Where intermediates are commercially available the corresponding preliminary steps may be omitted. For example, ortho, meta- and para-anisidines and phenetidines may be used as starting materials for the methoxy and ethoxy substituted compounds, requiring only conversion of the primary amines to the appropriate secondary amines.

The starting aminobenzenes, aminophenols or nitrophenols may contain various substituents on other positions of the aromatic nucleus in accordance with the definitions of $R_1$, $R_2$, $R_3$, $R_4$, $R_5$ and $R_6$ given for Formula I above.

Representative examples of preparation of the compounds are as follows:

EXAMPLE 1

Preparation of p-ethoxy-N-dodecylaminobenzene (a) p-Ethoxy-N-dodecanoylaminobenzene p-Phenetidine from a commercial source (13.7g, 0.1 mole) was added to sodium hydroxide solution (250 ml of 6%) in a 500 ml 3-neck flask equipped with a mechanical stirrer. The mixture was kept at 20° C. under vigorous stirring as lauroyl chloride (21.9g, 0.1 mole) was added dropwise over a period of one hour. Stirring continued for another hour and the creamy mass was extracted with methylene chloride. The residue, after removal of the methylene chloride, was crystallized from hexane to provide N-dodecanoyl-p-ethoxyaminobenzene. In two crops a total of 25g, (78%) of white needles were obtained, m.p. 107°–109° C.

(b) p-Ethoxy-N-dodecylaminobenzene

N-dodecanoyl-p-ethoxyaminobenzene (6g, 0.019 mole) was placed in a 250 ml round-bottom flask with Borane/THF complex (50 ml, 1M solution in tetrahydrofuran, stabilized with 5 mole percent sodium borohydride). The flask was flushed with nitrogen, stoppered with a drierite tube and allowed to stand at room temperature for 20 hours. Water was then added slowly to react with excess diborane. Formation of the amine salt was avoided by refluxing the reaction mixture with triethylamine (5 ml) for one hour. The mixture was cooled and the layers separated. The upper layer was washed with water (3 × 20 ml). A fourth wash emulsified the mixture. It was broken by addition of salt. The upper layer was dried with anh. sodium sulphate and evaporated to dryness yielding 5.56g (97%) of white plates of crude product. Crystallization from methanol afforded 4.3g (75%) of N-dodecyl-p-ethoxy-aminobenzene in the form of white plates, m.p. 38°–39° C.

EXAMPLE 2

Preparation of p-Dodecyloxy-N-dodecylaminobenzene (a) p-Dodecyloxynitrobenzene p-Nitrophenol (49.7g, 0.30 mole), anhydrous potassium carbonate (48.3g, 0.35 mole), dodecyl iodide (89g, 0.30 mole), and dodecyl bromide (25g, 0.1 mole) were stirred at reflux in dry acetone (500 ml) for 44 hours. (Either dodecyl bromide or dodecyl iodide or a mixture may be used.) The reaction mixture was cooled and filtered. The cake was washed with acetone and the combined filtrate evaporated to dryness. The residue was taken up in ether and water. The ether layer was washed with water until the water wash was colourless. The ether layer was dried with anhydrous sodium sulphate and evaporated to dryness on a rotary evaporator to yield a pale-brown oil (120g) which solidified on standing. The mass was crystallized at −15° C. from hexane (300 ml) and methanol (2 ml). Filtration yielded pale yellow crystals of p-dodecyloxynitrobenzene (95.3g, 89%), m.p. 51.5°–53° C.

(b) Reduction of p-dodecyloxynitrobenzene to p-dodecyloxyaminobenzene

The nitro compound (6g) was dissolved in absolute ethanol (200 ml) in a 500 ml Parr bottle. Palladium on charcoal (10%, 450 mg) was added and the mixture hydrogenated at 50 psi at room temperature. Hydrogen uptake was very rapid and was apparently finished in 50 minutes. The catalyst was removed by filtration three times through double Whatman #1 paper under vacuum. The colourless ethanol filtrate was evaporated on a rotary evaporator using a 35° C. water bath. The residue was dried at room temperature in high vacuum for 1 hour. Yield was 5.26g (97%) of p-dodecyloxyaminobenzene in the form of a creamy solid; m.p. 55°–56° C. with prior sintering.

(c) Acylation to amide and reduction of amide

The p-dodecyloxyaminobenzene was then acylated with lauroyl chloride to provide the corresponding amide which was reduced with diborane to provide the desired p-dodecyloxy-N-dodecylaminobenzene. Other alkoxyaminobenzenes can likewise be acylated with selected acyl chlorides to provide the corresponding amides which are then reduced with diborane to provide the desired alkoxy aromatic secondary amines.

EXAMPLE 3

Preparation of p-phenoxy-N-hexylaminobenzene (a) p-Phenoxy-N-hexanoylaminobenzene A suspension of p-phenoxyaminobenzene (3.4g, 0.019 mole) in aqueous sodium hydroxide (100 ml. 12% NaOH) was stirred magnetically. Hexanoyl chloride (2.80g, 0.021 mole) was added dropwise over five minutes. The suspension was stirred for one hour and shaken with water-methylene chloride. The organic layer was washed twice with water, dried over anh. sodium sulphate and evaporated to dryness, in vacuo. Weight of beige solid; 4.30g, 81%, m.p. 69°–76° C. A portion (4.14g) was crystallized from chloroform-hexane, filtered and dried for 16 hours at 48° C./10 mm. Weight of beige solid — 2.24g, m.p. 96°–98.5° C., sinters at 93° C. Recrystallized from the same solvents gave 1.90g beige crystals, m.p. 98.5°–99.5° C.

(b) p-Phenoxy-N-hexylaminobenzene

Purified p-phenoxy-N-hexanoylaminobenzene (1.61g) was cooled in an ice bath and 1M diborane in THF (15 ml) was added gradually. The resultant solution was kept at room temperature for 16 hours and then refluxed briefly (15 minutes). The solution was cooled and treated gradually with water (10 ml). Most of the THF was expelled at atmospheric pressure on a steam bath. The mixture was treated with 40% NaOH (5 ml) and heated on a steam bath for 1 hour. The resulting two-layer liquid was extracted with methylene chloride, the organic layer dried with anh. sodium sulphate and evaporated to dryness in vacuo yielding 1.42g of pale brown oil. The oil was recrystallized from chloroform-hexane at −15° C. overnight, filtered and dried to provide 0.73g of the desired product. Other aryloxyaminobenzenes can likewise be acylated with selected acyl chlorides to provide the corresponding amides which are then reduced with diborane to provide the desired aryloxy aromatic secondary amines, e.g. o-phenoxy-N-hexylaminobenzene may be prepared by starting with o-phenoxyaminobenzene.

EXAMPLE 4

Preparation of N-dodecylaminobenzene (a) N-dodecanoylaminobenzene

N-dodecanoylaminobenzene was prepared by acylation of aminobenzene with lauroyl chloride by a procedure similar to that of Example 1(a). After crystallization from hexane, a yield of 84% of white crystalline plates m.p. 76.3°–76.8° C. was obtained.

(b) N-dodecylaminobenzene

N-dodecylaminobenzene was prepared from the N-dodecanoylaminobenzene of (a) by reduction with diborane by a procedure similar to that of Example 1(b). A yield of 74% of white crystals from hexane, m.p. 26.7°–27.2° C. was obtained.

EXAMPLES 5–26

By procedures similar to those given in Examples 1 to 3 above, the following additional compounds were prepared:

5. p-Methoxy-N-dodecylaminobenzene from p-anisidine and lauroyl chloride followed by diborane reduction.
6. p-Methoxy-N-ethylaminobenzene from p-anisidine and acetyl chloride followed by diborane reduction.
7. p-Ethoxy-N-ethylaminobenzene by diborane reduction of phenacetin.
8. o-Phenoxy-N-hexylaminobenzene by procedure similar to Example 3, starting with o-phenoxynitrobenzene.
9. o-Methoxy-N-ethylaminobenzene from o-anisidine and acetyl chloride followed by diborane reduction.
10. o-Methoxy-N-butylaminobenzene from o-anisidine and butyryl chloride followed by diborane reduction.
11. o-Methoxy-N-hexylaminobenzene from o-anisidine and hexanoyl chloride followed by diborane reduction.
12. o-Butoxy-N-dodecylaminobenzene from o-nitrophenol by reaction with n-butyl iodide to provide o-butoxynitrobenzene, palladium-hydrogen reduction of the latter to o-butoxyaminobenzene, acylation of the o-butoxyaminobenzene with lauroyl chloride to form o-butoxy-N-dodecanoylaminobenzene and diborane reduction of the latter.
13. o-Methoxy-N-dodecylaminobenzene by acylation of p-anisidine with lauroyl chloride followed by diborane reduction of the resulting amide.
14. p-Methoxy-N-methylaminobenzene by reaction of p-anisidine with formic acid to form p-methoxy formanilide followed by diborane reduction of the latter.
15. p-Methoxy-N-propylaminobenzene by acylation of p-anisidine with n-propanoyl chloride followed by diborane reduction of the resulting amide.
16. p-Methoxy-N-butylaminobenzene by acylation of p-anisidine with n-butyryl chloride followed by diborane reduction of the resulting amide.
17. p-Methoxy-N-hexylaminobenzene by acylation of p-anisidine with hexanoyl chloride followed by diborane reduction.
18. p-Ethoxy-N-methylaminobenzene by reaction of p-phenetidine with formic acid followed by diborane reduction of the resulting p-ethoxy formanilide.
19. p-Ethoxy-N-butylaminobenzene by reaction of p-phenetidine with butyryl chloride followed by diborane reduction of the resulting amide.
20. p-Ethoxy-N-hexylaminobenzene by reaction of p-phenetidine with hexanoyl chloride followed by diborane reduction of the resulting amide.
21. p-Methoxy-N-(2,2-dimethylpropanoyl)-aminobenzene by acylation of p-anisidine with 2,2-dimethylpropanoyl chloride followed by diborane reduction of the resulting amide.
22. p-Methoxy-N-(2-phenylbutyl)-aminobenzene by acylation of p-anisidine with 2-phenylbutyryl chloride followed by diborane reduction of the resulting amide.
23. p-Secondary-butoxy-N-dodecylaminobenzene by reaction of p-nitrophenol with 2-iodobutane to provide p-sec. butoxynitrobenzene, palladium-hydrogen reduction of the latter to p-sec. butoxyaminobenzene, acylation of p-sec.-butoxyaminobenzene with lauroyl chloride followed by reduction of the amide with diborane.
24. o,p-Dimethoxy-N-dodecylaminobenzene by palladium-hydrogen reduction of o,p-dimethoxynitrobenzene to provide o,p-dimethoxyaminobenzene, acylation of the latter with lauroyl chloride, followed by diborane reduction of the resulting amide.
25. m-Methoxy-N-dodecylaminobenzene by acylation of m-anisidine with lauroyl chloride followed by diborane reduction of the resulting amide.
26. p-Methoxy-N-benzylaminobenzene by acylation of p-anisidine with benzoyl chloride followed by diborane reduction of the resulting amide.

EXAMPLE 27 p-Ethoxy-N-t-butylaminobenzene

A solution of p-anisidine in absolute ethanol was treated with dry HCl gas as a gentle stream for one half hour. Removal of the ethanol in vacuum gave the hydrochloride salt. The salt was transferred to a Parr bomb with dry t-butanol, sealed and heated at 180° C. for 64 hours. A maroon-coloured oil containing 80% N-t-butyl grouping was isolated. Column chromatography of the crude mixture on silicic acid provided the pure p-ethoxy-N-t-butylaminobenzene as a brown oil.

Other compounds within the scope of Formula I above are prepared in similar manner from the corresponding primary amines which in turn, when not available, are readily prepared from the corresponding nitrophenols.

COMPOSITIONS AND METHODS OF APPLICATION

In one embodiment of the invention, the aromatic secondary amines are introduced into the meat with the conventional curing solution and one aspect of the invention therefore relates to curing solutions containing a minor amount of aromatic secondary amine effective to reduce or eliminate the nitrosamine content of the cured, cooked meat. Emulsifying agents may be used to facilitate dispersion of the aromatic secondary amine component in the curing solution.

The curing agents are dissolved or dispersed in water to form a so-called "pickle" solution in which the meats are soaked or which is injected into the meats. A combination of these procedures can be used. Thus, the meat can be soaked in the pickle solution for a sufficient time to permit diffusion of the solution throughout the meat. Alternatively, the pickle solution can be pumped through the vascular system of the meat cut or injected directly into the muscle by use of a plurality of needles. After pumping or injection, the meat cut may be given a soaking period in the pickle solution. In the case of bacon, the amount of pickle solution incorporated in the meat may be in the order of about 10%, and in the case of hams may be about 18%. However, these amounts are subject to wide variations at the choice of the processor.

The quantities of the various ingredients in the pickle solution can be varied widely depending on the meat to be cured and the type of cure. Typically, the curing solution may contain, on a weight basis, in addition to nitrite salt, from about 5 to 25% NaCl, from about 4 to 12% of sugars, e.g., sucrose and dextrose, from about 0.1 to 4% ascorbate or isoascorbate, from about 0.001 to 0.5% aromatic secondary amine, from about 0.01 to 0.5% emylsifying agent and the remainder, water.

It has been found that amounts of aromatic secondary amine in the order of about 1 to 500 ppm (parts per million) by weight, based on the weight of the cured meat, incorporated in the meat either with the curing solution or after the meat has been cured will effectively reduce or eliminate the nitrosamines that are usually formed when nitrite-cured meat is fried or otherwise cooked at high temperature. With the preferred aromatic secondary amines, having an alkoxy substituent para to the secondary amino group, quantities in the meat in the range of about 20 to 200 ppm, based on the weight of cured meat will virtually eliminate nitrosamines in fried bacon. Since the activity of the aromatic secondary amine on a weight basis will vary somewhat depending upon the size of the molecule, the quantity may best be expressed in terms of moles. On this basis, the effective range may run from about 0.002 to 4.0 millimoles of aromatic secondary amine per kilogram of cured meat, with a preferred range being about 0.04 to 1.5 millimoles per kilogram of meat. The quantity of aromatic secondary amine in the meat is extremely low but nevertheless is effective to materially reduce or eliminate the known carcinogenic nitrosamines of cooked, cured meat products. The meat itself enjoys all of the advantages of the nitrite cure with respect to cure and protection against bacterial action.

Any suitable edible emylsifying agent that will facilitate the dispersion of the secondary amines in water may be used. Representative examples of emulsifying agents are the polyoxyalkylene derivatives of hexitol anhydride partial long chain fatty acid esters, known under the "Tween" trademark. However, the invention is not limited to the use of these representative substances.

In the processing of bacon, hams and the like, after incorporation of the pickle solution, the meat may be subjected to a conventional heating and/or smoking step. Typically, bacon is heated in this step to an internal temperature of about 55° C. and larger cuts such as hams to an internal temperature of about 67° C.

In another embodiment of the invention, a solution or dispersion of the aromatic secondary amines may be applied to the meat after curing, e.g. a solution of the selected aromatic secondary amine in a suitable liquid solvent medium may be sprayed or brushed on slices of the cured meat prior to packaging. Suitable liquids include edible oils as well as vaporizable solvents such as the lower aliphatic alcohols, e.g. ethanol and isopropanol. In general, concentrations of about 1 to 10% of the amine in the liquid medium are used. These compositions are applied to the meat surfaces in amounts to provide from about 1 to 500 ppm based on the weight of the cured meat or, as before stated with respect to application with the curing solution, from about 0.002 to 4.0 millimoles of aromatic secondary amine per kilogram of cured meat, with a preferred range of about 0.04 to 1.5 millimoles per kilogram of cured meat.

DESCRIPTION OF DRAWING

Reference is made to the drawing which graphically illustrates the dramatic reduction in nitrosamine content of the cook-out fat from fried bacon which was prepared from slices which had been treated with an oil solution of a representative compound of the invention so as to provide varying levels of the compound in the meat.

EXAMPLES OF PRACTICE

The invention will be further illustrated by the following examples of meat-curing compositions and their use.

EXAMPLE 28

A conventional meat curing solution was prepared by mixing 58.4g of NaCl, 21.2g of sucrose, 5.2g of dextrose and 0.66g of sodium nitrite with 308 ml. of water. Four center cuts of 1 kg. each were removed from paired bacon bellies. One of these cuts of bacon was used as a control sample and was injected with 87 ml (100 gm) of the conventional curing solution. 200 mg of p-methoxy-N-dodecylaminobenzene was dispersed into another 200 ml portion of the conventional curing solution with the aid of 500 mg. of Tween 60. An 87 ml portion of this solution was then injected into a second one of the 1 kg. cuts of bacon to provide 87 ppm of the aromatic secondary amine in the meat. A 100 ml. portion of the curing solution (which contained 100 mg. of the aromatic secondary amine) was diluted to 200 ml. with curing solution. An 87 ml. portion of this solution was injected into a third one of 1 kg. bacon cuts to provide 43.5 ppm of aromatic secondary amine in the meat. A 100 ml. portion of the diluted curing solution (which contained 50 mg. of the aromatic secondary amine) was again diluted to 200 ml. with curing solution. An 87 ml. portion of this diluted solution was injected into the fourth 1 kg. cut of bacon to provide 21.75 mg. of the secondary amine in the meat.

All four cuts of bacon after injection of curing solution as described above were processed by plant procedure (smoked and chilled) and were cut into slices according to the usual practice. The slices from each cut were then fried and 200 gram samples of the fat rendered from each lot during the frying were analyzed for nitrosamine content. The results were as follows:

TABLE I

| Sample No. | Aromatic Secondary Amine | Nitrosamine (ppb) |
|---|---|---|
|  | ppm |  |
| 1 (Control) | none | 44 |
| 2 | 87 | 0 |
| 3 | 43.5 | 6.2 |
| 4 | 21.75 | 3.1 |

Since the analytical means available are not accurate below about 3 ppb (parts per billion), it will be seen that the inclusion of the aromatic secondary amine at each level tested reduced the amount of nitrosamine content in the meat near or below the accurately determinable level. On the other hand, the nitrosamine content of the control sample was considerably above the accurately measurable level. Since the fat resulting from frying cured meat invariably contains the major portion of the nitrosamines formed during the frying, it has been demonstrated that the nitrosamine content of the fried meat has been virtually eliminated by use of the invention. No perceptible difference in color, aroma, or other condition of the cured and fried meat between the samples containing the same amounts of curing solution could be observed.

In order to further demonstrate the utility of compounds within the scope of Formula I above for reduction of nitrosamines in fried cured meats and to illustrate the alternative mode of application the following procedure was employed: Representative aromatic secondary amines, as listed in Tables II, III and IV below, were dissolved in winterized soya oil (4.5% concentration) and the resulting solution was streaked on bacon slices, which had undergone the conventional nitrite cure and plant processing, in a quantity providing a level of 100 ppm of the aromatic secondary amine in most instances. In the case of p-Methoxy-N-dodecylaminobenzene additional samples were tested at levels from 5 ppm to 100 ppm to demonstrate the range of effectiveness of the compounds. In the case of o-methoxy-N-dodecylaminobenzene samples were tested at 100, 200 and 300 ppm levels. The controls were streaked with oil alone. The results were as follows:

EXAMPLE 29

The results of the application p-methoxy-N-dodecylaminobenzene directly to the cured meat slices at different levels by the procedure described above is given in the following table:

TABLE II

| Substance | Mol. Wt. | ppm | mMoles in Kg of Bacon | NITROSAMINES Test (ppb) | Control (ppb) |
|---|---|---|---|---|---|
| p-Methoxy-N-dodecylamino-benzene | 291 | 5 | 0.0171 | 32.0 | 57.0 |
|  |  | 10 | 0.0343 | 20.0 | 57.0 |
|  |  | 20 | 0.0687 | 15.6 | 57.0 |
|  |  | 40 | 0.1374 | 3.7 | 57.0 |
|  |  | 80 | 0.2749 | 2.5* | 57.0 |
|  |  | 100 | 0.3436 | 1.9 | 76.0 |
|  |  | 100 | 0.3436 | 0.0 | 69.4 |
|  |  | 100 | 0.3436 | 0.0 | 20.0 |

*Figures below about 3 ppb are below accurate detection level of analytical procedure used.

EXAMPLES 30–45

The following Table illustrates the results of using the preferred class of p-alkoxy-N-alkylaminobenzenes and p-alkoxy-N-aralkylaminobenzenes by application directly to cured bacon slices as described above:

TABLE III

| Example | Mol. Wt. | ppm | mMoles in Kg of Bacon | NITROSAMINES Test (ppb) | Control (ppb) |
|---|---|---|---|---|---|
| 30. p-Ethoxy-N-dodecylaminobenzene | 305 | 100 | 0.3278 | 1.9* | 76.0 |
|  |  |  |  | 3.0 | 60.0 |
| 31. p-Dodecyloxy-N-dodecylaminobenzene | 445 | 100 | 0.2247 | 2.1 | 29.0 |
| 32. p-Methoxy-N-ethylaminobenzene | 151 | 100 | 0.6622 | 0.0 | 42.5 |
| 33. p-Ethoxy-N-ethylaminobenzene | 165 | 100 | 0.6060 | 0.0 | 42.5 |
| 34. p-Methoxy-N-methylaminobenzene | 137 | 100 | 0.7299 | 0.0 | 32.5 |
| 35. p-Methoxy-N-butylaminobenzene | 179 | 100 | 0.5587 | 0.0 | 28.2 |
| 36. p-Methoxy-N-hexylaminobenzene | 207 | 100 | 0.4831 | 0.0 | 28.2 |
| 37. p-Ethoxy-N-methylaminobenzene | 151 | 100 | 0.6623 | 0.0 | 28.2 |
| 38. p-Ethoxy-N-butylaminobenzene | 193 | 100 | 0.5181 | 0.0 | 28.2 |
| 39. p-Ethoxy-N-hexylaminobenzene | 221 | 100 | 0.4525 | 0.0 | 28.2 |
| 40. p-Methoxy-N-(2,2-dimethylpropyl)-aminobenzene | 193 | 100 | 0.5186 | 1.3 | 17.5 |
| 41. p-Sec.butoxy-N-dodecylaminobenzene | 334 | 100 | 0.2294 | 1.2 | 20.0 |
| 42. p-Ethoxy-N-t- | 179 | 100 | 0.5587 | 2.2 | 19.1 |

TABLE III-continued

| Example | Mol. Wt. | ppm | mMoles in Kg of Bacon | NITROSAMINES Test (ppb) | Control (ppb) |
|---|---|---|---|---|---|
| butylaminobenzene | | | | | |
| 43. p-Methoxy-N-benzylaminobenzene | 213 | 100 | 0.4694 | 2.5 | 34.0 |
| 44. p-Methoxy-N-(2-phenylbutyl)-aminobenzene | 255 | 100 | 0.3922 | 2.5 | 34.0 |
| 45. o,p-Dimethoxy-N-dodecylaminobenzene | 321 | 100 | 0.3115 | 2.5 | 23.0 |

*Figures below about 3 ppb are below accurate detection level of analytical procedure used.

EXAMPLES 46–55

The following Table illustrates the results of using other aromatic secondary amines by application directly to cured bacon slices as described above:

TABLE IV

| Example | Mol. Wt. | ppm | mMoles in Kg of Bacon | NITROSAMINES Test (ppb) | Control (ppb) |
|---|---|---|---|---|---|
| 46. m-Methoxy-N-dodecylaminobenzene | 291 | 100 | 0.3436 | 6.6 | 34.0 |
| 47. N-Dodecylaminobenzene | 261 | 100 | 0.3831 | 16.0 | 76.0 |
| 48. p-Phenoxy-N-hexylaminobenzene | 269 | 100 | 0.3717 | 8.5 | 41.0 |
| 49. o-Phenoxy-N-hexylaminobenzene | 269 | 100 | 0.3717 | 26.0 | 41.0 |
| 50. o-Methoxy-N-butylaminobenzene | 179 | 100 | 0.5587 | 10.6 | 36.2 |
| 51. o-Methoxy-N-hexylaminobenzene | 207 | 100 | 0.4831 | 11.9 | 36.2 |
| 52. o-Butoxy-N-dodecylaminobenzene | 333 | 100 | 0.3003 | 10.6 | 36.2 |
| 53. o-Methoxy-N-dodecylaminobenzene | 291 | 100 | 0.3436 | 10.6 | 36.2 |
|  |  | 200 | 0.6872 | 6.2 | 32.5 |
|  |  | 300 | 1.0309 | 6.6 | 32.5 |
| 54. o-Methoxy-N-ethylaminobenzene | 151 | 100 | 0.6623 | 10.6 | 36.2 |

It will be seen from Table III that the p-alkoxy-N-alkylaminobenzenes and p-alkoxy-N-aralkylaminobenzenes are all effective at the 100 ppm level of application to the cured meat to virtually eliminate the formation of undesirable nitrosamines when the meat is fried. A comparison of Table IV with Table III indicates that compounds which have no substituents in the para position on the aromatic nucleus are not as effective at the 100 ppm level as those which are so substituted, but nevertheless materially reduce the formation of the undesirable nitrosamines. As increase in the level of these compounds in the cured meat would be expected to further reduce the formation of nitrosamines (See Example 53).

Surprisingly, the secondary amines of the Forumla I above have been found to be about twice as effective as the corresponding primary amines, the latter being the subject of our copending application Ser. No. 619,053 mentioned above. In other words, it has been found that approximately one-half the quantity of secondary amine is required to accomplish the same result as accomplished with the primary amines.

This invention can also be applied to the reduction of nitrosamine-forming capacity in nitrite-cured chopped meat products as well as any other nitrite cured meat products which may be subjected to cooking temperatures encountered in frying, grilling or broiling.

The embodiments of the invention in which an exclusive property or privilege is claimed are defined as follows:

1. a meat treating composition comprising a solution or dispersion of an aromatic secondary amine in a nitrite-containing meat curing solution, the amount of said aromatic secondary amine being effective to reduce the nitrosamine content of nitrite cured meat treated by said composition and cooked at frying temperature, said aromatic secondary amine having the formula:

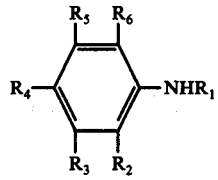

wherein:
$R_1$ is a hydrocarbon radical of one to eighteen carbon atoms; and $R_2$, $R_3$, $R_4$, $R_5$ and $R_6$ are each selected from:
(a) hydrogen,
(b) a hydrocarbon radical as defined for $R_1$ above,
(c) —$OR_7$ where $R_7$ is hydrogen or a hydrocarbon radical as defined for $R_1$ above; or
two adjacent members $R_2$, $R_3$, $R_4$, $R_5$ and $R_6$ are cyclized to form the group $+CH_2+_n$ where $n$ is 3 to 5, with the remaining substituents being as defined above; with the proviso that at least one of $R_2$, $R_3$, $R_4$, $R_5$ and $R_6$ is —$OR_7$ as defined above.

2. The meat treating composition of claim 1 wherein $R_4$ is alkoxy.

3. The meat treating composition of claim 1 wherein $R_4$ is alkoxy and $R_2$, $R_3$, $R_5$ and $R_6$ are hydrogen.

4. The meat treating composition of claim 1 wherein the meat curing solution is an aqueous solution and the aromatic secondary amine is dispersed in said solution with the aid of an edible emulsifying agent.

5. The meat curing composition of claim 4 wherein the aromatic secondary amine is present in the solution in an amount of about 0.001 to 0.5% based on the weight of the solution.

6. A composition for the curing of meats comprising an aqueous curing solution containing sodium chloride, a sugar, an alkali metal nitrite curing salt and from about 0.001 to 0.5% of a p-alkoxy-N-alkylaminobenzene compound wherein the alkoxy and alkyl groups each contain from 1 to 18 carbon atoms.

7. A process for nitrosamine control in nitrite cured meats comprising treating the meat during or after the nitrite cure with an amount of an aromatic secondary amine effective to reduce the quantity of nitrosamines formed when the cured meat is cooked at frying temperature, said aromatic secondary amine having the formula:

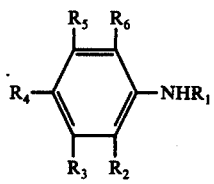

wherein:
$R_1$ is a hydrocarbon radical of one to eighteen carbon atoms; and $R_2$, $R_3$, $R_4$, $R_5$ and $R_6$ are each selected from:
(a) hydrogen
(b) a hydrocarbon radical as defined for $R_1$ above,
(c) —$OR_7$ where $R_7$ is hydrogen or a hydrocarbon radical as defined for $R_1$ above; or
two adjacent members $R_2$, $R_3$, $R_4$, $R_5$ and $R_6$ are cyclized to form the group —$(CH_2)_n$— where $n$ is 3 to 5, with the remaining substituents being as defined above; with the proviso that at least one of $R_2$, $R_3$, $R_4$, $R_5$ and $R_6$ is —$OR_7$ as defined above.

8. The process of claim 7 wherein the aromatic secondary amine is applied to the meat in an amount such that the cured meat contains from about 0.002 to 4.0 millimoles per kilogram of meat.

9. The process of claim 7 wherein the aromatic secondary amine is applied to the meat in an amount such that the cured meat contains from about 0.04 to 1.5 millimoles per kilogram of meat.

10. The process of claim 7 wherein the aromatic secondary amine is dispersed in the nitrite curing solution and the solution is injected into the meat.

11. The process of claim 7 wherein the aromatic secondary amine is dissolved in liquid solvent medium and the solution is applied to surfaces of sliced cured meat.

12. The process of claim 7 wherein the meat is a pork cut for production of bacon.

13. The process of claim 11 wherein the meat is sliced bacon.

14. A process for the curing of bacon so as to reduce the quantity of nitrosamines formed when the cured bacon is subjected to frying temperatures, comprising curing said bacon with a nitrite curing solution containing an amount of a p-alkoxy-N-alkyaminobenzene compound sufficient to provide from about 0.04 to 1.5 millimoles per kilogram of meat, the alkoxy and alkyl groups of said compound each containing from 1–18 carbon atoms.

15. The process of claim 14 wherein the curing solution contains alkali metal nitrite, sodium chloride and a sugar dissolved therein and the p-alkoxy-N-alkylaminobenzene is dispersed in said solution with an edible emulsifier.

16. The process of claim 14 wherein the curing solution is injected into the meat.

17. A process for the control of nitrosamine formation during cooking of nitrite cured bacon comprising applying to slices of the cured bacon an edible oil solution of a p-alkoxy-N-alkylaminobenzene compound, said solution being applied to the bacon slices in an amount sufficient to provide from about 0.04 to 1.5 millimoles of the said compound per kilogram of bacon.

18. A nitrite cured meat product containing from about 0.04 to 1.5 millimoles per kilogram of a compound of the formula:

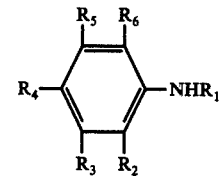

wherein:
$R_1$ is a hydrocarbon radical of one to eighteen carbon atoms; $R_2$, $R_3$, $R_4$, $R_5$ and $R_6$ are each selected from:
(a) hydrogen,
(b) A hydrocarbon radical as defined for $R_1$ above,
(c) —$OR_7$ where $R_7$ is hydrogen, a hydrocarbon radical as defined for $R_1$ above,
or two adjacent members $R_2$, $R_3$, $R_4$, $R_5$ and $R_6$ are cyclized to form the group —$(CH_2)_n$— where $n$ is 3 to 5.

19. The product of claim 18 wherein the nitrite cured meat is bacon.

20. The product of claim 19 wherein the compound is a p-alkoxy-N-alkylaminobenzene.

* * * * *

UNITED STATES PATENT OFFICE
CERTIFICATE OF CORRECTION

Patent No. 4,076,849        Dated February 28, 1978

Inventor(s) Bharucha et al.

It is certified that error appears in the above-identified patent and that said Letters Patent are hereby corrected as shown below:

Column 1, line 56, change "use" to --us--.

Column 2, line 4, change "are" to --is--.

Column 2, line 5, change "are" to --is--.

Column 3, line 4, before "bacterial" insert --anti---.

Column 10, Table 3, Item 42, change "p-Ethoxy-N-t" to --p-Methoxy-N-t--.

Claim 14, line 5, change "alkyaminobenzene" to --alkylaminobenzene--.

Signed and Sealed this

Fifteenth Day of August 1978

[SEAL]

Attest:

RUTH C. MASON
Attesting Officer

DONALD W. BANNER
Commissioner of Patents and Trademarks